(12) United States Patent
Even (10) Patent No.: US 7,520,088 B2
(45) Date of Patent: Apr. 21, 2009

(54) FISHING DIVER WITH DUAL TRIPPING DEVICES AND INDEXING ARRANGEMENT USED IN LINE TENSIONING

(76) Inventor: Randy P. Even, 4226 S. 13th St., Sheboygan, WI (US) 53081

( * ) Notice: Subject to any disclaimer, the term of this patent is extended or adjusted under 35 U.S.C. 154(b) by 0 days.

(21) Appl. No.: 11/940,706

(22) Filed: Nov. 15, 2007

(65) Prior Publication Data

US 2008/0060253 A1    Mar. 13, 2008

Related U.S. Application Data

(63) Continuation-in-part of application No. 11/451,273, filed on Jun. 12, 2006.

(51) Int. Cl.
*A01K 91/08* (2006.01)
(52) U.S. Cl. ................................................. 43/43.13
(58) Field of Classification Search ............... 43/43.13, 43/43.12
See application file for complete search history.

(56) References Cited

U.S. PATENT DOCUMENTS

| | | | | |
|---|---|---|---|---|
| 1,307,623 A * | 6/1919 | Edmondson | ............... | 43/43.13 |
| 1,361,602 A * | 12/1920 | Marks | ...................... | 43/43.13 |
| 1,670,184 A * | 5/1928 | Bond | ........................ | 43/43.13 |
| 2,052,262 A * | 8/1936 | Walberg | ..................... | 43/44.88 |
| 2,170,594 A * | 8/1939 | Nicholson | .................. | 43/43.12 |
| 2,247,583 A * | 7/1941 | Louthan | ..................... | 43/43.13 |
| 2,273,209 A * | 2/1942 | Louthan | ..................... | 43/43.13 |
| 2,597,288 A * | 5/1952 | Caldwell | .................... | 43/43.13 |
| 2,994,622 A * | 8/1961 | Miller | ........................ | 43/43.12 |
| 3,037,317 A * | 6/1962 | Morrison et al. | ........... | 43/43.13 |
| 3,081,575 A * | 3/1963 | Meisner | ..................... | 43/43.12 |
| 3,181,266 A * | 5/1965 | Lenfvenius | ................ | 43/43.13 |
| 3,269,051 A * | 8/1966 | Saunders, Jr. | .............. | 43/43.12 |
| 3,447,255 A * | 6/1969 | Walden | ..................... | 43/43.13 |
| 3,524,277 A * | 8/1970 | Neubert | ..................... | 43/43.13 |
| 3,643,370 A * | 2/1972 | Cook et al. | ................. | 43/43.13 |
| 3,755,955 A * | 9/1973 | Saia | ........................... | 43/43.13 |
| 3,766,681 A * | 10/1973 | Mander | ..................... | 43/43.12 |
| 3,813,809 A * | 6/1974 | Frotiee | ....................... | 43/43.13 |
| 3,818,624 A * | 6/1974 | Duffy | ......................... | 43/43.13 |
| 3,835,573 A * | 9/1974 | Borchardt | .................. | 43/43.13 |
| 3,839,813 A * | 10/1974 | DeSmidt et al. | ............ | 43/43.13 |
| 3,844,059 A * | 10/1974 | Weber | ........................ | 43/43.13 |
| 3,879,884 A * | 4/1975 | Tucker, Sr. | ................. | 43/43.12 |
| 3,898,759 A * | 8/1975 | Jensen | ....................... | 43/43.13 |
| 3,905,148 A * | 9/1975 | Naone et al. | ............... | 43/43.12 |

(Continued)

*Primary Examiner*—Darren W Ark
(74) *Attorney, Agent, or Firm*—Andrus, Sceales, Starke & Sawall, LLP (57) ABSTRACT

A fishing diver is provided by a diving plane with a first releasable tripping device having a latched condition clamping the diving plane to the line such that upon trolling, the diver dives downwardly at an angle to the trolling line, and having a released condition unclamping the diving plane from the line. The diver includes a second tripping device associated with and engageable with the releasable first tripping device. The second tripping device has a latched condition engageable with the fishing line, and a released condition responsive to the strike of the fish on the lure for causing the first tripping device to reach its released condition and provides free sliding passage of the line through a guide structure on the diving plane. The fishing diver includes an indexing arrangement for the first and second tripping devices.

3 Claims, 4 Drawing Sheets

U.S. PATENT DOCUMENTS

| | | | | |
|---|---|---|---|---|
| 3,940,872 A | * | 3/1976 | Weber | 43/43.13 |
| 3,961,438 A | * | 6/1976 | Henze et al. | 43/43.12 |
| 3,971,154 A | * | 7/1976 | Craig | 43/43.13 |
| 4,028,840 A | * | 6/1977 | Wille | 43/43.13 |
| 4,069,611 A | * | 1/1978 | Dusich et al. | 43/43.12 |
| 4,199,890 A | * | 4/1980 | Austin et al. | 43/43.12 |
| 4,254,573 A | * | 3/1981 | Mastropaolo | 43/43.13 |
| 4,320,592 A | * | 3/1982 | Kirsch | 43/43.13 |
| 4,395,841 A | * | 8/1983 | Cudnohufsky | 43/43.12 |
| 4,417,414 A | * | 11/1983 | Hood et al. | 43/43.12 |
| 4,428,142 A | * | 1/1984 | Shedd et al. | 43/43.12 |
| 4,430,823 A | * | 2/1984 | Henze et al. | 43/43.12 |
| 4,513,524 A | * | 4/1985 | Jolliff | 43/43.13 |
| 4,567,687 A | * | 2/1986 | Even et al. | 43/43.13 |
| 4,581,842 A | * | 4/1986 | Kalberer | 43/43.13 |
| 4,656,776 A | * | 4/1987 | Macachor | 43/43.12 |
| 4,696,124 A | * | 9/1987 | Wille | 43/43.12 |
| 4,813,172 A | * | 3/1989 | McCue | 43/43.12 |
| 4,920,689 A | * | 5/1990 | Anderson | 43/43.13 |
| 5,107,616 A | * | 4/1992 | Ryder | 43/43.12 |
| 5,170,581 A | * | 12/1992 | Lyons | 43/43.12 |
| 5,339,561 A | * | 8/1994 | Weber | 43/43.13 |
| 5,867,932 A | * | 2/1999 | Reiger | 43/43.13 |
| 5,867,933 A | * | 2/1999 | Walker | 43/43.13 |
| 5,875,583 A | * | 3/1999 | Church | 43/43.13 |
| 5,921,015 A | * | 7/1999 | Newell et al. | 43/43.12 |
| 5,979,104 A | * | 11/1999 | Walker | 43/43.12 |
| 6,016,622 A | * | 1/2000 | Even | 43/43.13 |
| 6,119,389 A | * | 9/2000 | Walker | 43/43.13 |
| 6,243,983 B1 | * | 6/2001 | Walker | 43/43.13 |
| 6,256,924 B1 | * | 7/2001 | Walker | 43/43.13 |
| 6,412,215 B1 | * | 7/2002 | Even | 43/43.13 |
| 7,178,284 B2 | * | 2/2007 | Chamberlain | 43/43.12 |
| 7,380,366 B1 | * | 6/2008 | Barrow | 43/43.13 |
| 2005/0102885 A1 | * | 5/2005 | Albrant, Jr. | 43/43.12 |
| 2006/0086035 A1 | * | 4/2006 | Chamberlain | 43/43.12 |
| 2006/0213113 A1 | * | 9/2006 | Emory | 43/43.13 |
| 2006/0260181 A1 | * | 11/2006 | Enos et al. | 43/43.13 |
| 2007/0119091 A1 | * | 5/2007 | Osborn et al. | 43/43.13 |
| 2008/0060253 A1 | * | 3/2008 | Even | 43/43.13 |
| 2008/0083153 A1 | * | 4/2008 | Ford | 43/43.13 |

* cited by examiner

FISHING DIVER WITH DUAL TRIPPING DEVICES AND INDEXING ARRANGEMENT USED IN LINE TENSIONING

CROSS REFERENCE TO RELATED APPLICATION

This application is a continuation-in-part of U.S. patent application Ser. No. 11/451,273, filed Jun. 12, 2006.

BACKGROUND AND SUMMARY OF THE INVENTION

The invention relates generally to a fishing diver or sinker for carrying bait or a lure down to deeper depths of water when trolling, and more particularly, pertains to a fishing diver having a tripping device with latched and released conditions.

The invention provides a diver which is clamped to a fishing line extending therethrough. In the latched condition, the diver is locked onto the line. In the unlatched condition, the diver may freely slide along the line. When the fish bites, the latch trips, and the line slides freely through the diver, whereby the fish need not pull the diver along with it, which otherwise may result in increased line breakage.

The line length between the diver and the fish is adjustable, which may be desirable for differing locales or for certain types of fish. Regardless of the line length between the diver and the fish, when the fish bites and the latch is released, the fish is directly reeled in and netted because the trolling line extends through the diver and is also the baiting line. In contrast, if a first trolling line is tied to the front of the diver, and a second separate baiting line is tied to the rear of the diver, the length of the baiting line cannot be greater than the length of the fishing pole, otherwise the fish cannot be netted when reeled all the way in. This maximum limit on the length of the bait line may be undesirable.

The present invention relates to an improvement in U.S. Pat. No. 6,016,622 issued Jan. 25, 2000, the disclosure of which is hereby incorporated by reference. In that patent, a fishing diver having a tripping device includes a diving plane having a forward end and a rearward end, and guide structure on the diving plane for guiding a fishing line, one end of the line extending to a baiting lure or the like and the other end of the line being reelable for trolling. The diver includes a releasable latch member on the diving plane having a latched condition clamping the diving plane to the line such that upon trolling, the diver dives from downwardly at an angle to the trolling line. The latch member has a released condition responsive to the strike of a fish on the lure unclamping the diving plane from the line and enabling the diving plane to slide along the line in the trolling direction. The latch member includes a pivoted latch arm, a front upstanding tab on the forward end of the diving plane pivotably mounting the latch arm and also guiding the line rearwardly through the tab. The latch arm has an eyelet at the end thereof opposite the front tab, the line extending through the eyelet, then through the front tab. A protective sleeve in the form of an elongated coil spring encircles the line and extends rearwardly of the front tab, and then through and beyond the eyelet such that an inside surface of the spring provides an increase surface for the line in the vicinity of the eyelet whereby to minimize the line breakage. The latch arm in the latched condition is pivoted rearwardly and frictionally held by gripper jaws along a central portion of the latch arm between the eyelet end and the pivotally mounted end. A screw passes through the gripper jaws to adjust the frictional retaining force of the latch arm in the jaws in the latched condition.

The above described '622 patent generally provides an effective fishing diver design to minimize line breakage in both the latched and released conditions of the latch arm. However, it has been discovered that if the frictional retaining force on the latch arm is improperly set, problems may arise. For example, if the frictional retaining force is too light, such as when trolling for smaller fish, the force of the water acting on the diving plane may prematurely trip the diver to its released condition before a fish is caught. If the frictional retaining force is set too high, smaller fish may be caught and dragged along on the lure indefinitely without reaching the released condition. In this latter condition, not only is the fishing person unaware of a fish on the line, but also the presence of the fish being dragged along on the lure tends to deter other fish from lures on adjacent lines in the water.

Accordingly, it is desirable to provide a fishing diver which remedies these problems and enables greater fishing efficiency.

It is a main object of the present invention to provide an enhanced fishing diver having two separate, but cooperating tripping devices. It is also an object of the present invention to provide a fishing diver having a protective, flexible sleeve which surrounds a portion of the fishing line in a manner which will minimize line breakage. Another object of the present invention is to provide a fishing diver provided with an enhanced latch arrangement which is secured to variously-shaped diving planes. It is also an object of the present invention to provide a fishing diver which is economical to manufacture and operates generally similarly to prior art fishing divers. It is also an object of the present invention to provide a fishing diver with tripping devices having an indexing arrangement used in line tensioning.

In one aspect of the invention, a fishing diver includes a diving plane and guide structure on the diving plane for guiding a fishing line along the plane of the diving plane through the guide structure. One end of the line extends to a baiting lure and the other end of the line is reelable for trolling. The fishing diver also includes a releasable latch structure on the diving plane having a latched condition clamping the diving plane to the line such that upon trolling, the diver dives downwardly at an angle to the line. The latch structure also has a released condition unclamping the diving plane from the line, the line through the guide structure extending substantially parallel to the plane of the diving plane in the released condition of the latch structure. The latch structure includes an eyelet guiding the other end of the line therethrough and forwardly to the guide means. The invention is improved by a releasable tripping structure associated and engageable with the releasable latch structure. The tripping structure has a latched condition engageable with the fishing line extending from the guide structure, and a released condition responsive to the strike of a fish on the lure for causing the latch structure to reach its released condition and provide free sliding passage of the line through the guide structure.

The latch structure has one force adjusting device for establishing a releasable force for its released condition, and the tripping structure has another force adjusting device for establishing another release force for its released condition. The tripping structure includes an eyelet having an extension frictionally and slidably received in a tubular latch arm pivotable about the latch structure. The tubular latch arm of the tripping structure includes an inner end pivotable about the one force adjusting device and engageable with a latch arm fixed to the eyelet of the latch structure. A deformable sleeve is disposed in the eyelet of the latch structure for surrounding the line and preventing the line from coming into contact with the eyelet of the latch structure.

In another aspect of the invention, a fishing diver includes a diving plane having a forward end and a rearward end. A guide structure is provided on the diving plane for guiding a fishing line, one end of the line extending to a baiting lure and the other end of the line being reelable for trolling. A first releasable tripping structure is provided on the diving plane having a first force adjusting screw and a latched condition clamping the diving plane to the line such that upon trolling, the diver dives downwardly at an angle to the line. The first tripping structure has a released condition unclamping the diving plane to slide along the line in a trolling direction. The tripping structure includes a first pivoted latch arm, and a front upstanding tab on the forward end of the diving plane pivotally mounting the first latch arm and also guiding the line rearwardly through the tab. The first latch arm has a first eyelet at the end thereof opposite the front tab, the line extending through the first eyelet, then through the front tab. A second releasable tripping structure is connected to and engageable with the first releasable tripping structure. The second tripping structure has a second force adjusting screw and a second pivoted latch arm pivotable about the first force adjusting screw, and provided with a second eyelet engageable with the fishing line in a latched condition. The second tripping structure has a released condition responsive to the strike of a fish on the lure for causing engagement of the second latch arm with the first latch arm and providing free sliding passage of the line through the guide structure.

The second eyelet is adjustable on the second latch arm. The second latch arm is tubular and the second eyelet has an extension frictionally received and retained in the tubular second latch arm. The second latch arm has a curved end opposite the second eyelet that is pivotable about the first force adjusting screw and engageable with an underside of the first latch arm. The first tripping structure includes a first pair of spaced gripper jaws extending upwardly on a forward end of the diving plane, and the second tripping structure includes a second pair of spaced gripper jaws extending rearwardly from the first pair of gripper jaws. The second eyelet includes a rubber grommet. A deformable sleeve is disposed in the first eyelet for surrounding the line and preventing the line from coming into contact with the first eyelet as the line passes therethrough to minimize breakage of the line thereat. The sleeve is defined by an elongated spring. In the latched condition, the second latch arm is frictionally held by the second pair of gripper jaws at an acute angle relative to the diving plane. In the released condition, the second latch arm pivots downwardly out of frictional engagement with the second pair of gripper jaws and extends along the diving plane. The first force adjusting screw passes through the first pair of gripper jaws, and the second force adjusting screw passes through the second pair of gripper jaws. Turning of the first and second force adjusting screws enable different levels of frictional retension of the first latch arm and the first pair of gripper jaws and the second latch arm and the second pair of gripper jaws.

In yet another aspect of the invention, a fishing diver includes a diving plane having a forward end and a rearward end. A guide structure on the diving plane is provided for guiding a fishing line, one end of the line extending to a baiting lure and the other end of the line being reelable for trolling. A first releasable tripping structure is provided on the diving plane having a first force adjusting screw and a latched condition clamping the diving plane to the line such that upon trolling, the diver dives downwardly at an angle to the line. A first tripping structure has a released condition unclamping the diving plane to slide along the line in a trolling direction. The first tripping structure includes a first pivoted latch arm, and a front upstanding tab on the forward end of the diving plane pivotally mounting the first latch arm and also guiding the line rearwardly through the tab. The first latch arm has a first eyelet at the end thereof opposite the front tab, the line extending through the first eyelet and then through the front tab. A second releasable tripping structure is connected to and engageable with the first releasable tripping structure. The second tripping structure has a second force adjusting screw and a second pivoted latch arm pivotable about the first force adjusting screw, and provided with a second eyelet engageable with the fishing line in a latch condition. The second tripping structure has a released condition responsive to the strike of a fish on the lure for causing engagement of the second latch arm with the first latch arm and providing free sliding passage of the lure through the guide structure. A protective sleeve in the form of an elongated coil spring encircles the line and extends rearwardly of the front tab, and then passes through and beyond the first eyelet such that an inside surface of the spring defines an increased surface area for the line in the vicinity of the first eyelet whereby to minimize line breakage.

In still another aspect of the invention, a fishing device includes a guide device on the plane for guiding a fishing line along a surface of the plane through the guide device with one end of the line extending to a baiting lure, and the other end of the line being reelable for trolling. At least one releasable tripping device is provided on the plane having a pair of jaws spaced by a gap adjusted by a force adjusting screw. A pivoted latch arm is frictionally retained by the jaws and designed to guide the fishing line. Turning of the force adjusting screw creates different levels of frictional tension of the latch arm in the jaws to establish a desired tensioning on the line. The tripping device has a latched condition clamping the plane to the fishing line, and a released condition responsive to the strike of a fish on the line for unclamping the fishing line and providing free sliding passage of the fishing line through the guide device.

The invention is improved by an indexing arrangement provided on at least one of the jaws and at least partially surrounding a hole in the jaw receiving the force adjusting screw. The indexing arrangement defines a standard of reference used in recording a rotary position of the force adjusting screw when it is turned to establish tensioning. In the preferred embodiment, the indexing arrangement includes a series of index elements on one of the jaws extending radially outwardly from a periphery of a hole in the jaw receiving the force adjusting screw.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figures 1, 2:
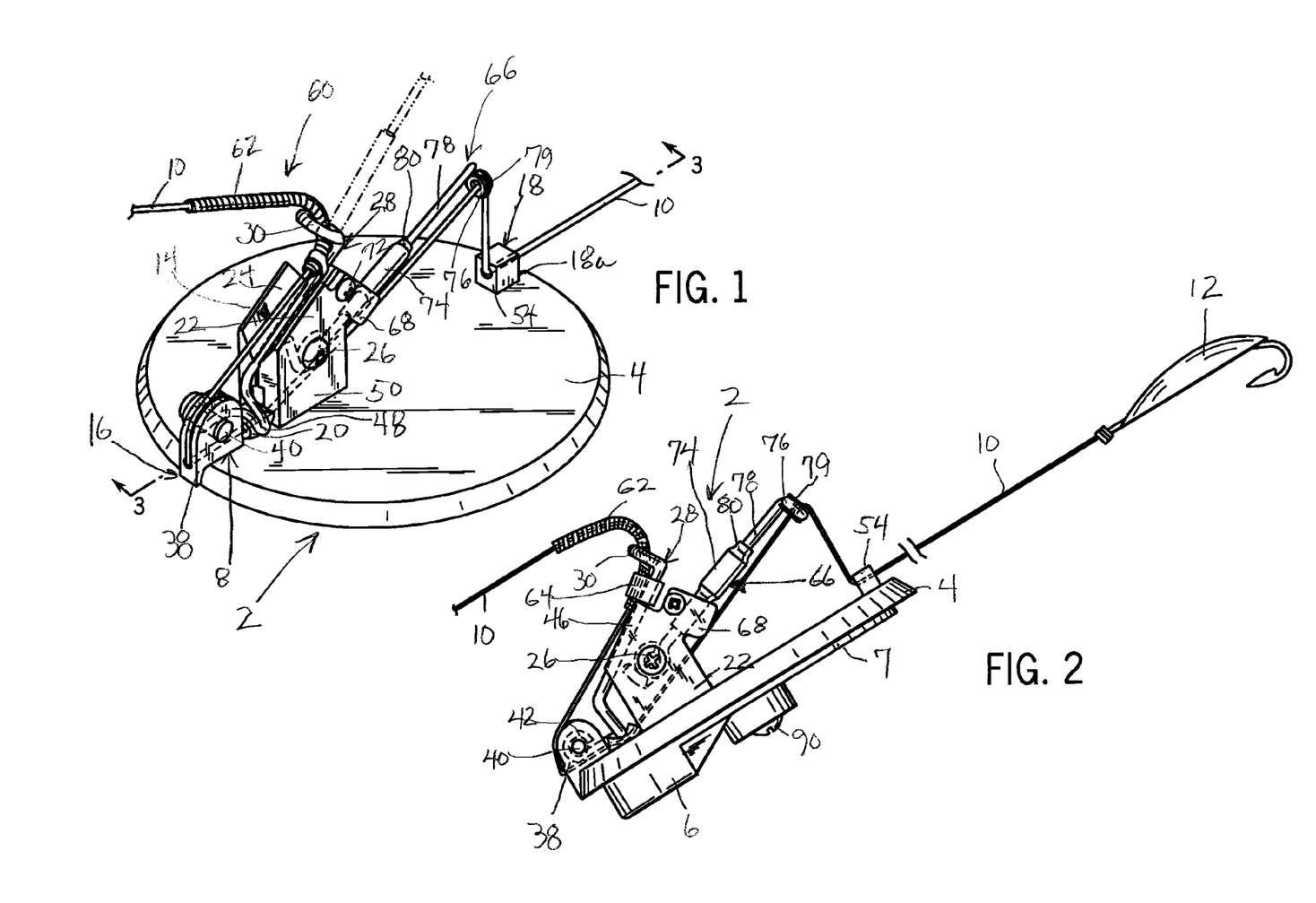
FIG. 1 is a top perspective view of a fishing diver having dual tripping devices in a latched condition.
FIG. 2 is a side elevational view of FIG. 1.
Figure 3:
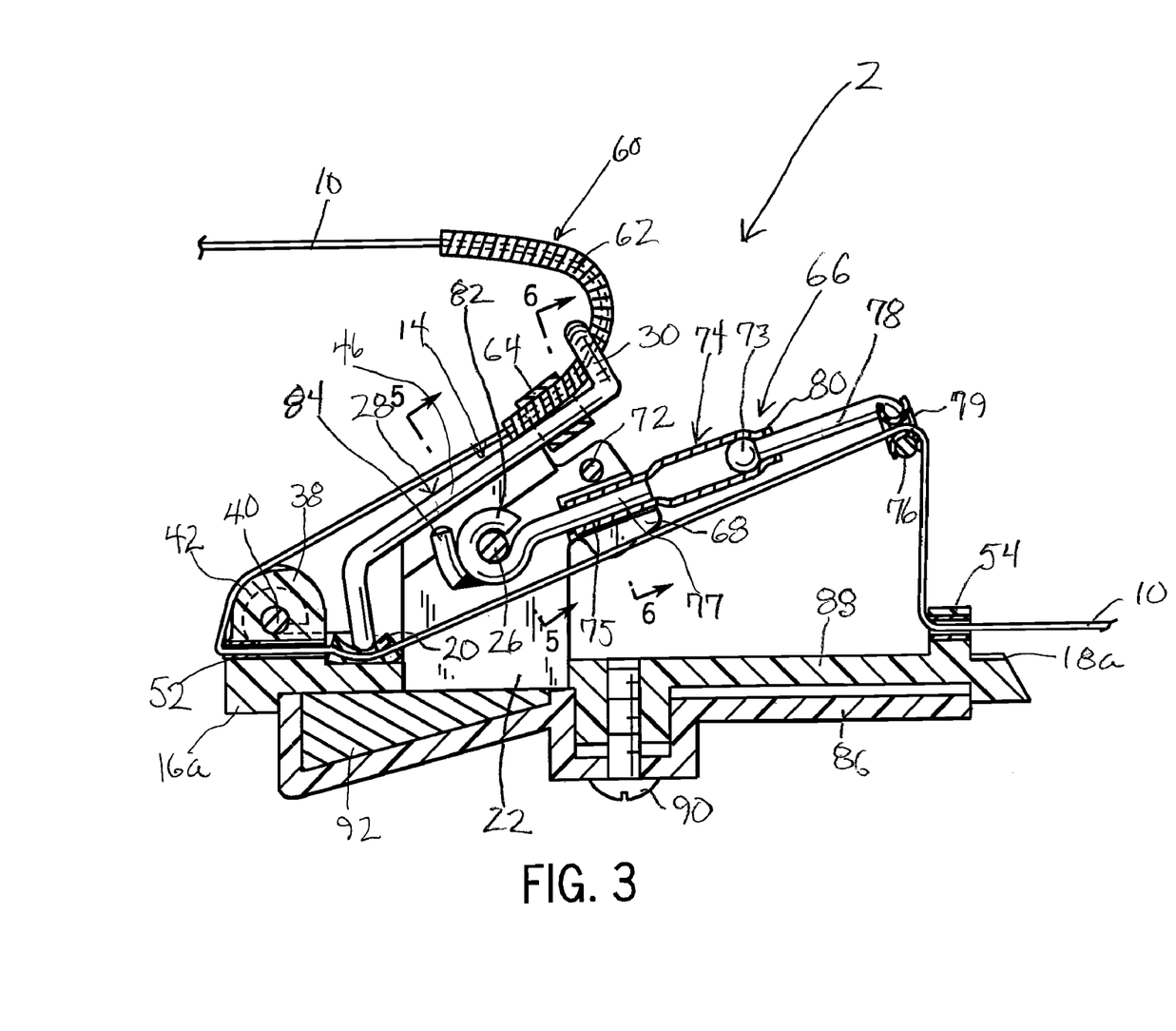
FIG. 3 is a sectional view of the fishing diver of FIG. 2.
Figures 4, 5, 6:
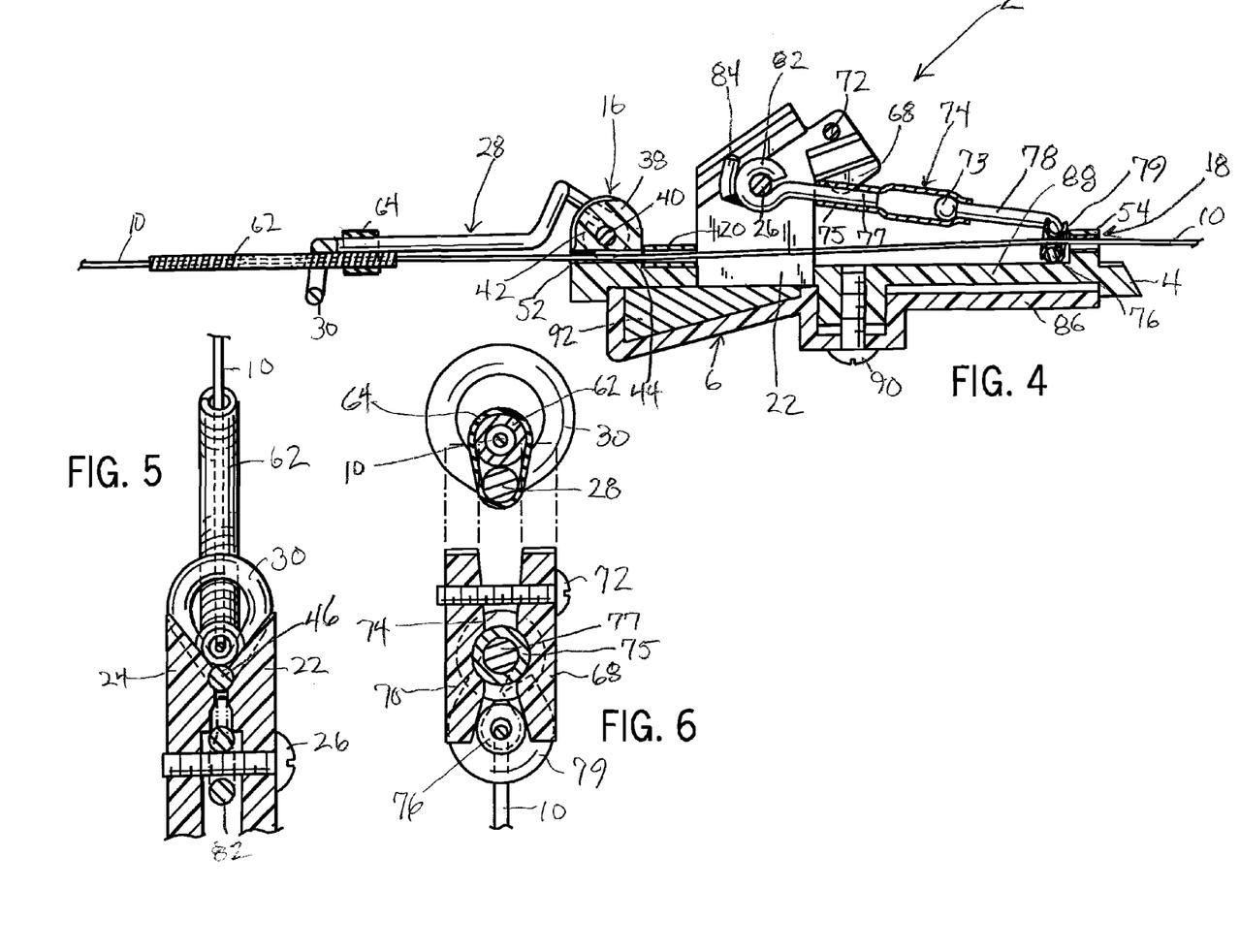
FIG. 4 is a view like FIG. 3 but showing the diver in a released condition.
FIG. 5 is a sectional view taken on line 5-5 of FIG. 3.
FIG. 6 is a sectional view taken on line 6-6 of FIG. 3.

FIGS. 1-6 show a fishing diver 2 comprising a circular diving plane 4 which may be forwardly weighted at 6 in an integral base 7 (FIG. 2). Guide means 8 on the diving plane guides a fishing line 10 along the plane of diving plane 4. One end of line 10, for example the right end, extends to a baiting lure or the like 12, and the other end of the line, for example the left end of line 10, is reelable, such as from a fishing pole, for trolling or the like. A first releasable latch or tripping means 14 on diving plane 4 has a latched condition (FIGS. 1-3), clamping diving plane 4 to line 10 such that upon trolling, the diver dives downwardly (FIG. 2), at an angle to the trolling line, left end of 10. Latch or tripping means 14 has a released condition (FIG. 4) responsive to the strike of a fish on lure 12 unclamping diving plane 4 from the line and enabling free sliding passage of line 10 through guide means 8 along the plane of diving plane 4. Line 10 extends contiguously along the top planar surface of diving plane 4 in both the latched and released conditions of latch means 14.

Guide means 8 includes front and rear guide members 16 and 18 located on front and rear ends 16a, 18a, respectively, on the top planar surface of diving plane 4. Line 10 extends through and rectilinearly between front and rear guide members 16 and 18 in each of the latched and released conditions of latch means 14. Latch or tripping means 14 includes gripper means 20 for gripping line 10 between front and rear guide members 16 and 18 to clamp diving plane 4 to line 10. In one form, gripper means 20 is a resiliently collapsible tubular member, for example soft rubber. Line 10 extends through the tubular member 20 and is gripped by and clamped between opposing inner surfaces of tubular member 20 in the latched condition.

First latch or tripping means 14 includes friction grip jaw means located on the front end 16a of the diving plane 4 provided by a pair of upstanding jaws 22 and 24 spaced by a gap adjusted by a first force adjusting screw 26. Diving plane 4 and upstanding jaws 22 and 24 are typically made of plastic and integrally molded. A pivoted latch arm 28 has a latched position frictionally engaged between and held by jaws 22 and 24 and including an eyelet 30 guiding line 10 therethrough then forwardly (FIGS. 1-3) to front guide member 16. Latch arm 28 in the latched position (FIGS. 1-3) coacts with line gripper means 20 to clamp diving plane 4 to line 10. Latch arm 28 is frictionally released from jaws 22 and 24 upon the strike of a fish on lure 12. Turning of screw 26 clockwise (FIG. 1) will increase the frictional gripping of latch arm 28 by jaws 22 and 24. The latch arm 28 in the released position unclamps gripper means 20 and line 10. In the released position of latch arm 28 (FIG. 4) line 10 extends rectilinearly rearwardly through eyelet 30 and front and rear guide members 16 and 18.

Fishing line 10 is guided through guide members 16, 18 along the top planar surface of diving plane 4. In the released position, diving plane 4 may slide along line 10 in the trolling direction, with line 10 sliding freely through the guide members 16, 18.

A front upstanding tab 38 on the diving plane 4, for example of integrally molded plastic, is forward of jaws 22 and 24 and pivotally mounts latch arm 28, as at screw 40 extending through a looped portion 42 at the pivoted end of latch arm 28 and through tab 38. Tab 38 also guides line 10 rearwardly therethrough along passage 44 drilled or otherwise formed longitudinally forward-rearward through the base of tab 38 along the top planar surface of diving plane 4. Latch arm 28 has eyelet 30 at the end thereof opposite front tab 38. In the latched position, latch arm 28 is pivoted from tab 38 rearwardly and frictionally engaged and held by jaws 22 and 24 along a central portion 46 between the eyelet end at 30 and the pivotally mounted end 42. Arm 28 includes a line clamping portion 48 coacting in the latched position with line gripper means 20 between the base 50 of jaws 22 and 24 and the front tab 38 to clamp diving plane 4 to line 10. Upon release, arm 28 pivots forwardly to the released position (FIG. 4) unclamping gripper means 20 and line 10, the line extending freely through eyelet 30 on arm 28 then rearwardly through tab 38 and front guide member 16 and through jaws 22, 24 and rear guide member 18.

In the latched clamped position, the top outer surface of tubular member 20 is engaged by line clamping portion 48 of arm 28 to collapse tubular member 20 and press the bottom outer surface of tubular member 20 against the top of diving plane 4. This in turn causes the opposing inner surfaces of tubular member 20 to clamp and grip line 10 therebetween. Line 10 is thus gripped and clamped between the inner surfaces of a soft rubber tubular member 20 rather than being gripped between jaw members or the like such as 22 and 24. This provides extended line life because the line is not pulled away from such jaw type members in a ripping or frictionally releasing type manner. Instead, central portion 46 of latch arm 28 is gripped between jaws 22 and 24. Arm 28 is made of steel or the like, and thus not subject to damage or breakage from its frictional engagement with and release from jaws 22 and 24. In alternate species, tube 20 is eliminated, and line clamping portion 48 of arm 28 is the line gripper means or is provided with a rubber or the like wrapped therearound to grip line 10 and frictionally clamp it against the top of diving plane 4. Likewise in these species, line breakage is significantly reduced because the clamping function does not require that the line be ripped or pulled away from frictional jaws or the like upon the strike of the fish. Instead, latch arm 28 at portion 46 is subject to such frictional unclamping wear, thus saving the line from undergoing such stress. This substitution of latch arm portion 46 for line 10 in being subjected to the frictional clamping and unclamping wear and tear substantially diminishes line breakage.

A front bushing 52 is provided in the front of front tab 38 at the base thereof along the top planar surface of diving plane 4 for guiding line 10 therethrough. A rear bushing 54 is provided in the rear end 18a along the top planar surface of diving plane 4 for guiding the line therethrough. This has been found to further reduce line breakage.

Fishing diver 2 includes a shielding arrangement 60 for protecting the line 10 as it passes through eyelet 30. In particular, arrangement 60 is embodied preferably in the form of an elongated, deformable coil spring 62 encircling the line 10 as the line extends upwardly and rearwardly of front tab 38, alongside central portion 46 of latch arm 28, through and against an inner, upper portion of eyelet 30, and then beyond eyelet 30 forwardly and upwardly for a predetermined distance. Spring 62 is retained on the uppermost end of latch arm central portion 46 by a resiliently collapsible tubular member 64 which tightly surrounds spring 62 and central portion 46. In the latched condition shown in FIGS. 1-3 and 5, spring sleeve 62 assumes a curved formation around eyelet 30 and line 10 is engaged with an inner surface of sleeve. In the released condition shown in FIG. 8, spring sleeve 62 assumes a straight formation such that a longitudinal axis of sleeve is substantially parallel to the top surface of the diving plane 4, and the line 10 is disengaged from sleeve 62. It should be understood that the inside surface of spring sleeve 62 defines an increased surface area for the line 10 in the vicinity of eyelet 30 so that line breakage is further minimized.

In accordance with the present invention, the fishing diver 2 includes a second latch or tripping means 66 including friction grip jaw means extending rearwardly from upstanding jaws 22, 24. The friction grip jaw means are defined by a pair of supplementary jaws 68, 70 (FIG. 6) spaced by a gap adjusted by a second force adjusting screw 72. A second pivoted latched arm 74 has a latched condition (FIGS. 1-3) frictionally engaged by and held between jaws 68,70 at an acute angle relative to diving plane 4 and including an eyelet 76 at an outer end guiding line 10 therethrough from a rear guide member 18 and then rearwardly. Eyelet 76 includes an extension 78 having a ball 73 (FIG. 3) that is frictionally and telescopically received in latch arm 74 which, unlike latch arm 28, is tubular. Eyelet 76 also includes a rubber grommet 79 to protect the line 10 from breakage. Latch arm 74 has a restricted tubular portion 75 which is integral with an extension 77. The outer end of latch arm 74 is provided with a retainer 80 to prevent the complete removal of the eyelet 76 and its extension 78. Latch arm 74 is thus provided with a movable eyelet 76 so that the length of the latch arm 74 is adjustable to accommodate different fishing situations. Extension 77 has a curved portion 82 that pivots about the first force adjusting screw 26, and terminates in an inner end 84 that is engageable with the underside of latch arm 28 to release the latch arm 28 from jaws 22, 24.

Diving plane 4 is comprised of a base portion 86 removably joined to a top portion 88 such as by a removable fastener 90. The forward end of diving plane 4 includes a recess for accommodating a weight 92 which is selectively positionable to control the path of diver 2 as it moves through the water.

In use, the latch arms 28, 74 are placed in their latched conditions (FIGS. 1-3) and the first and second force adjusting screws 26, 72 are turned appropriately to create desired settings. For example, if fishing for smaller fish, the clamping force of the jaw 68, 70 on latch arm 74 is set lighter than when fishing for larger fish. When a fish strikes the lure 12, the latch arm 74 is released from jaws 68, 70 and pivots downwardly about screw 26. This causes the inner end 84 of latch arm 74 to engage the underside of latch arm 28 and release latch arm 28 from jaws 22, 24. The fishing diver 2 is now in the released condition (FIG. 4) wherein the diving plane 4 is released from the line 10 so that line 10 may freely slide through front and rear guide members 16, 18 as the fish is reeled in. In the released condition, the latch arm 74 extends along the diving plane 4. The clamping force on jaws 22, 24 is set appropriately so that the water force subjected upon the diving plane 4 will not cause a premature release of the latch arm 28.

In the fishing diver 2 shown in FIGS. 1-6, the diving plane 4 is represented in a circular or cylindrical profile. However, it should be understood that the diving plane 4 can also take different configurations such as a commercially available trolling ski or planer (not shown).

Figure 7:
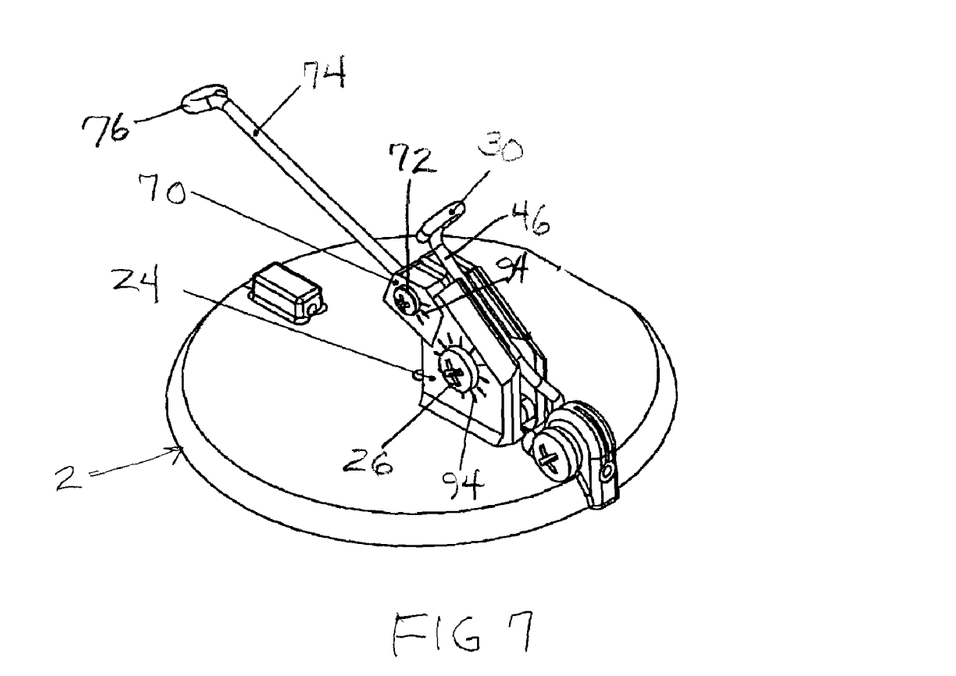
FIG. 7 is a perspective view of the fishing diver similar to FIG. 1 with the fishing line removed and with an indexing arrangement for the force adjusting screws; and, FIG. 8 is an elevational view of FIG. 7.
Figure 8:
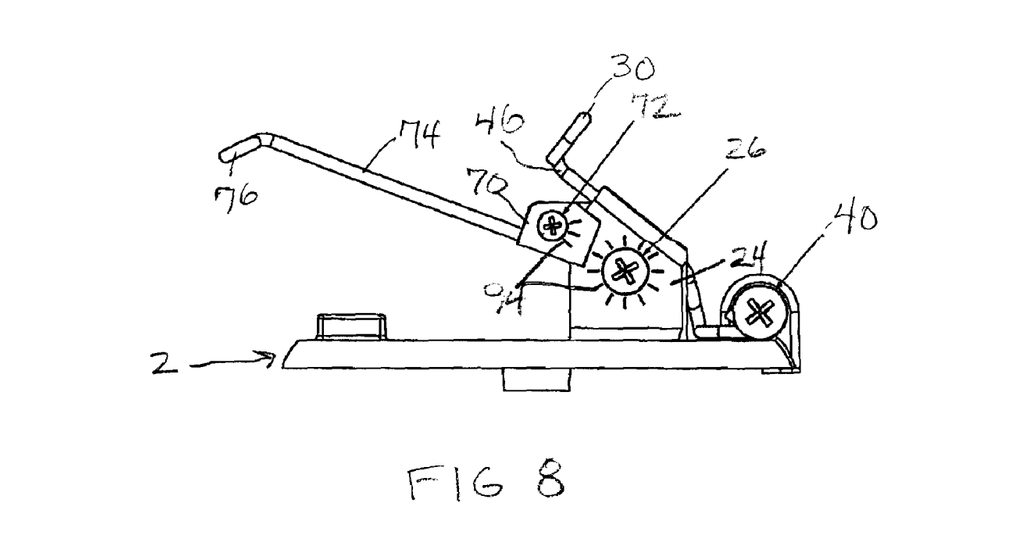

Referring now to FIGS. 7 and 8, the present invention also contemplates an indexing arrangement provided on at least one and preferably both of the jaws 24 and 70. The indexing arrangement is extremely useful to the fisherman in turning the force adjusting screws 26, 72 so as to establish a record of tensioning of fishing lines for similar fishing divers being used during a fishing outing.

More specifically, the indexing arrangement includes a series of index elements or marks 94 extending radially outwardly of the periphery of jaw holes receiving the force adjusting screws 26, 72 on the respective jaws 24, 70. In the preferred embodiment, index elements 94 partially surround force adjusting screw 26 on jaw 24, and completely surround force adjusting screw 72 on jaw 70. The index elements 94 may take any form or arrangement, but typically are radially extending straight lines or grooves that are equally spaced apart, in this case 30°, so as to simulate the hour markings on a conventional analog rotary time clock.

In use, a fisherman will turn screws 26, 72 to create desired settings for the release of the tripping means 14, 66. As the fisherman establishes the desired tensioning on the tripping means 14, 66 by turning the screws 26, 72, the fisherman notes the rotary position of the screws 26, 72 relative to the index elements 94, and records these settings in a log book or the like. For example, the fisherman might desire to set screw 26 at a "5:00" setting, and screw 72 at a "11:00" setting. The index elements 94 can be conveniently used by the fisherman to retain repeated consistent tensioning in similar fishing divers.

Although index elements 94 are shown provided for both jaws 24, 70 of the fishing diver having multiple tripping means 14, 66, it should be fully understood that the index elements 94 can also be used on jaws of the fishing diver having a single tripping means and a single force adjusting screw, or on jaws of one of the multiple tripping means.

While the invention has been described with reference to a preferred embodiment, those skilled in the art will appreciate that certain substitutions, alternations and omissions may be made without departing from the spirit thereof. Accordingly, the foregoing description is meant to be exemplary only and should not be deemed limitative on the scope of the invention set forth with the following claims.

I claim:

1. A fishing device in combination with a fishing line comprising:
   a plane having a forward end and a rearward end;
   guide means on the plane for guiding the fishing line, one end of the fishing line extending to a baiting lure and an other end of the fishing line being reelable for trolling;
   a first releasable tripping means on the plane having a first pair of jaws spaced by a gap adjusted by a first force adjusting screw received in first holes formed in the first pair of jaws and a latched condition clamping the plane to the fishing line such that upon trolling, the device dives downwardly at an angle to the fishing line, the first tripping means having a released condition unclamping the plane to slide along the fishing line in a trolling direction, the first tripping means including a first pivoted latch arm frictionally retained by the first pair of jaws, the first latch arm having a front end and a rear end, a front upstanding tab on the forward end of the plane pivotally mounting the first latch arm and also guiding the fishing line rearwardly through the front upstanding tab, the front end of the first latch arm being attached at the front upstanding tab, the first latch arm having a first eyelet at the rear end of the first latch arm opposite the front tab, the fishing line extending through the first eyelet and then through the front tab;
   a second releasable tripping means connected to and engageable with the first releasable tripping means, the second tripping means having a second pair of jaws spaced apart by a gap adjusted by a second force adjusting screw received in second holes formed in the second pair of jaws, and a second pivoted latch arm pivotable about the first force adjusting screw, the second latch arm being frictionally retained by the second pair of jaws and provided with a second eyelet engageable with the fishing line in a latched condition, the second tripping means having a released condition responsive to a strike of a fish on the lure for causing engagement of the second latch arm with the first latch arm and providing free sliding passage of the fishing line through the guide means, wherein turning of the first and second force adjusting screws creates different levels of frictional retention of the first and second latch arms in the respective first and second pair of jaws to establish desired tensioning on the fishing line, and a series of index elements provided on at least a single jaw of the first and second pairs of jaws and extending radially outwardly of at least a single periphery of the first and second holes in the jaws for recording rotary positions of the first and second force adjusting screws when they are turned to establish tensioning.

2. The combination of claim 1, wherein the index elements partially surround the at least one single periphery of the first and second holes.

3. The combination of claim 1, wherein the index elements completely surround the at least one single periphery of the first and second holes.

* * * * *